3,202,705
PROCESS FOR PRODUCING COLOR STABLE
LACTIC ACID
Eugene L. Powell and Robert J. Praizler, Chicago, Ill., assignors to American Maize-Products Company, a corporation of Maine
No Drawing. Filed May 26, 1960, Ser. No. 31,821
4 Claims. (Cl. 260—535)

This invention relates to a method of producing lactic acid by fermentation.

Lactic acid produced by ordinary fermentation processes darkens in color, particularly at elevated temperatures, unless the acid is removed from the fermentation process liquor. Since color formation is highly objectionable in food applications, color stable grades of lactic acid are conventionally produced by extracting the acid from the fermentation process liquor by steam distillation under high vacuum, by solvent extraction, or by methylation of crude lactic acid and continuous distillation of the resulting ester in methyl alcohol vapor. The equipment required for these extraction processes is expensive and the cost of carrying out the processes is considerable.

We have now discovered that when fermentation process liquor is subjected to the action of cation exchange resins it is possible to produce a color stable lactic acid without separating the acid from the mother liquor of the fermentation process. The treatment with cation exchange resins removes or in some way inactivates objectionably color-forming materials in the fermentation process liquor to give a product with excellent color stability and the treatment eliminates the need for extracting the acid from the fermentation process liquor. As a result we achieve tremendous savings in terms of cost and handling of materials since our method eliminates the expensive equipment required in the conventional extraction processes as well as the processes themselves. Furthermore, we have been able to demonstrate that the color stability of the lactic acid produced from our cation exchange resin treatment is comparable to that of lactic acid which has been extracted or removed from the fermentation process liquor by conventional means.

Our invention may be used in association with any of the conventional fermentation processes for producing lactic acid. Generally, in these processes a fermentation mash is first prepared which contains a carbohydrate material and a proteinaceous nutrient. Mineral and organic salts may also be added as supplementary nutrients. Any fermentable carbohydrate such as molasses, starch hydrolyzates, corncobs, Jerusalem artichokes, whey and potatoes may be used, with sugars such as dextrose, levulose, maltose, sucrose, and dextrin being preferred. Examples of proteinaceous nutrients are non-denatured milk proteins, molasses, corn germ meal cake, wheat grits, and glue. A lactobacillus fermenting microorganism such as *Lactobacillus delbruckii* or *Lactobacillus leichmanni* is added to the fermentation mash and the temperature of the resulting mixture is maintained at about 120° F. where the microorganism is most active and fermentation proceeds most rapidly. As the lactic acid is produced it is neutralized with calcium carbonate or lime to prevent the pH of the fermentation mixture from falling low enough to inhibit fermentation. The fermentation liquor contains about 15% to 20% calcium lactate when fermentation is complete.

After fermentation is completed the process liquor is heated to the so called death point, approximately 180° F., to kill all active microorganisms. This will take about one hour at the elevated temperature. Thereafter the liquor is cooled and solids are removed by conventional filtration. The process liquor is then bleached with an insoluable adsorbent material such as activated carbon. Materials such as vegetable carbon, activated charcoal, bone char, bentonite and diatomaceous earth may be used. The general procedure is to mix and agitate the process liquor and the finely divided absorbent material together. Thereafter the adsorbent material is filtered out of the process liquor in conventional manner. The bleaching step lightens the color and removes colloidal impurities.

After bleaching is completed, the process liquor is acidified with sulfuric acid to convert the calcium lactate to lactic acid. Simultaneously, calcium ion precipitates as calcium sulfate which is removed from the process liquor by filtration. Sufficient sulfuric acid is added to insure complete conversion of the calcium lactate and precipitation of calcium ion. In order to form a color stable product the soluble lactic acid is separated from the process liquor by distillation or solvent extraction processes.

In accordance with our invention we preferably treat the fermentation process liquor with cation exchange resin after the liquor has been bleached and after the calcium lactate therein has been converted to lactic acid and the precipated calcium sulfate has been removed from the liquor by filtration.

This is the preferred process since the conventional steps of bleaching and filtering out calcium ion as precipitated calcium sulfate reduce the load on the cation exchange resin by removing colloidal impurities and precipitable cations which otherwise would be extracted from the liquor by the cation exchange resin itself.

Prior to passage through the cation exchange resin we prefer to concentrate the fermentation process liquor to a lactic acid concentration of approximately 80% by weight of the liquor. This is accomplished by evaporating water from the process liquor until the desired concentration of lactic acid is established. At 80% lactic acid concentration the viscosity of the process liquor at room temperature is approximately 21 centipoises and there is no problem of sluggish flow through the cation exchange resin due to too high a viscosity. Although we prefer the 80% concentration, the process liquor can be treated with cation exchange resin at any desired lower concentration of lactic acid.

The process liquor is best treated with cation exchange resin by percolating the liquor through a fixed bed of the resin. For this purpose a glass column filled with cation exchange resin is suitable. The fermentation process liquor at 80% concentration of lactic acid is passed through the resin at a rate of 1000 grams per hour per square inch of bed surface. This rate is low enough to insure intimate contact between the resin and the liquor but if desired other rates of flow may be employed. As the liquor travels down through the resin the objectionable color-forming material therein is removed by the resin or it is inactivated and remains in the liquor. The effluent discharged from the column is a water white homogenous solution of lactic acid in the fermentation process liquor and its color stability is comparable to that produced by solvent extraction or steam distillation in conventional manner. Color stability of the effluent was determined in conventional manner by heating a test tube containing a 30 cc sample in a bath maintained at 180° C. After thirty minutes the test tube was withdrawn from the bath and its contents examined. The liquid was perfectly transparent and the water white without any sign of darkening of color. Samples of conventionally treated process liquor which had not been subjected to the cation resin treatment darkened considerably and became hazy when tested in the same manner.

We do not now understand the exact mechanism of the way in which the cation ion exchange resin is effective for producing our color stable product. We have found out, however, that the effluent contains a surprisingly small amount of amino acids, and we were unable to detect any soluble proteinaceous material in the effluent. The amount of amino acids was less that 100 ppm. as compared to latic acid produced in conventional manner which contains about 3000 ppm. of amino acids and the soluble proteinaceous material was less than the acceptable accuracy of the Kjeldahl method for protein determination. It is believed that the removal of the proteinaceous material and reduction of amino acid concentration materially contributes to the color stability of the product but other factors are undoubtedly involved.

But regardless of the exact mechanism which may be later proven of the way in which the cation exchange resin is effective for our purpose the fact remains that our product has commercial color stability and may be used with particular advantage in foods without objectional effect on color.

As the resin nears exhaustion the color stability of the effluent will become progressively poorer until the resin is finally exhausted. At this point the resin is regenerated.

The procedure for regeneration of the cation exchange resin begins by washing the resin with water which removes residual lactic acid that may have been trapped in the resin.

The water wash is continued until 0.25% by weight or less of latic acid remains in the rinse water. During the washing step very little, if any, of the extracted color-forming material on the resin is dissolved. In fact we have found that it is essential to wash the resin with an aqueous solution of strong alkali in order to successfully remove the extracted color-forming material and regenerate the resin. While we do not now completely understand the reasons for this, we believe that the alkaline wash by completely discharging the negative charges on the resin thereby destroys the attraction for the extracted color-forming material. Also, the alkaline wash appears to cause swelling of the resin particles whereby the extracted color-forming material is physically loosened. The combination of these two effects allows the extracted color-forming material to be readily washed off the resin with water after the alkali treatment.

Any strong alkali may be used to discharge the cation exchange resin. Aqueous solutions of sodium hydroxide, potassium hydroxide, ammonium hydroxide, and calcium hydroxide are suitable. In general, the concentration of the alkali need not be more than about 10% by weight. This concentration is adequate for removing the extracted color-forming material and any higher concentration of alkali is a waste of alkali. The amount of aqueous alkali used to wash the resin is not critical as long as all portions of the resin are completely contacted with alkali. For example, if a column containing about 40½ cubic inches of cation resin is used, the alkaline wash can be accomplished by pouring 1000 ml. of 5% sodium hydroxide solution into the top of the column at a rate of about 30 ml. per minute.

After the alkaline wash, any residual alkali in the column is displaced by washing with water until the column is completely free of alkali. Then the resin is back washed, that is, a volume of water about twice the volume of the alkaline wash solution is introduced into the bottom of the column and forced up through the cation resin therein. The back wash helps to develop spaces between the cation resin particles which may have become closely packed during use and during the washing operations. Back wash also disrupts any channeling that may have developed in the resin bed. After the back wash the resin is regenerated to the hydrogen cycle by washing with an aqueous solution of strong mineral acid. Acids such as hydrochloric, sulfuric, or any cheap acid are satisfactory. The concentration of acid is not critical and we prefer to use an aqueous solution of about 7% to 10% acid by weight. After the aqueous acid solution has passed through the resin and the resin has been charged to the hydrogen cycle, the resin is washed with water in order to remove any residual acid that may remain in the column. The volume of water will depend on the amount of resin that is employed. For example, with the 40½ cubic inches of resin mentioned above, approximately 600 ml. of water is adequate to remove traces of acid from the resin. The resin is ready for treating additional frementation process liquor after the step of removing residual acid has been carried out. Best results in preparing the resin for treatment of additional process liquor are achieved with a back wash as described above. However, this is not absolutely essential as long as cations are available on the resin for exchange. Also, the term regenerated to the hydrogen cycle as used herein is intended to mean any treatment of the exhausted cation resin which provides the resin with cations, usually hydrogen ions but not limited thereto, which can be exchanged for cations in the process liquor.

Although the color of the process liquor discharged from the cation resin is water white and has color stability, if desired color stability can be slightly further improved by an additional step in processing using an anion exchange bed. In this procedure the cation resin threated process latic acid is passed through a column of anion exchange resin which has been previously regenerated on the hydroxide cycle. The effluent is a water white aqueous solution of lactic acid having exceptional purity and color stability. The anion resin removes trace amounts of anionic organic nitrogen compounds. These materials are formed during fermentation and/or processing of the lactic acid. The anion exchange resin is regenerated by adjusting it to the hydroxide cycle in conventional manner by washing with an aqueous solution of a strong base such as sodium, potassium or ammonium hydroxide. The anion exchange resin may then be used to treat additional process liquor discharge from the cation resin column. For commercial food applications, the color stability of the lactic acid achieved by the cation resin treatment alone is excellent and the anion resin treatment is not necessary. However, in some cases as in medicinal applications or some other special use it may be desirable to improve the color stability with the anion resin treatment.

As to the ion exchange resins these are well known in the art and any strongly acidic cation exchange resin may be used to remove and/or inactivate the objectionable color-forming mtterial in the fermentation process liquor. The ordinary cation exchange resins commercially available are high molecular weight synthetic polymers and resins which contain a plurality of acid groups having ionizable hydrogen ions such as sulfonic and carboxylic acid groups. Specific examples of cation exchange resins useful in our process are sulfonated polystyrenes, condensation products of phenol, formaldehyde and sulfonic acid and sulfonated styrene-divinylbenzene copolymers. Although any cation exchange resin will remove and/or inactivate the objectionable color-forming material in process liquor, it is desirable to use porous beads of resin in order that the resin can be readily regenerated. A porous bead of resin contains microchannels distributed in random manner throughout the spherical bead and this type of structure is regenerated with less difficulty than a solid bead or particle. For this reason we prefer to use cation resins having a porous structure for treatment of the fermentation process liquor.

Any anion exchange resin may be used for the optional anion resin treatment of the cation exchanged fermentation process liquor. Anion exchange resins also are high molecular weight synthetic polymers and resins which contain a plurality of basic amino groups. They can be prepared by the reaction of a polyamine, phenol and formaldehyde or by nitration and subsequent reduction of a styrene-divinylbenzene copolymer. One specific example of an anion exchange resin is the reaction product of guanidine and formaldehyde. Both cation and anion exchange resins are, for the most part, sold under trade names such as those of the Amberlite, Dowex, Duolite or Permutit series. As is known these are sold in a variety of grades of strength and porosity and the particular grade of resin selected for carrying out the process of our invention can be readily determined by one skilled in the art in connection with the commercial operation at hand.

Although we prefer to bleach the fermentation process liquor with activated carbon and to acidify the calcium lactate with sulfuric acid prior to treating the process liquor with cation exchange resin, this particular order of steps is not essential. The cation resin treatment may be carried out at any time after the desired fermentation of the carbohydrate material in the fermentation mash is completed. For example, the step of carbon bleaching can be omitted and the cation exchange resin itself can be used to acidify the calcium lactate in the process liquor. However, this procedure markedly increases the load on the cation resin since in addition to the color-forming material, colloidal impurities and metallic cations will be extracted from the process liquor and the operative life of the resin before exhaustion will be correspondingly reduced. This makes the procedure less desirable than our preferred process where rapid exhaustion of the cation resin due to colloidal impurities and metallic cations is avoided.

The following examples will illustrate specific details of the process of our invention and are not to be considered a limitation thereof.

*Example 1*

A fermentation process liquor containing lactic acid was prepared in conventional manner. The liquor was heated to 180° F. and held at that temperature for about one hour. After that period of time the heating was stopped and the liquor was filtered and was subjected to a carbon bleach in conventional manner by addition of carbon granules. Then the carbon granules were removed from the liquor by filtration. The liquor was then acidified with sulfuric acid and the precipitated calcium sulfate was removed by filtration. Water was evaporated off under vacuum until the concentration of lactic acid in the liquor reached 80% by weight. The liquor was then poured into the top of a glass column 30 inches high which contained 40.6 cubic inches of a porous sulfonated polystyrene cation exchange resin regenerated on the hydrogen cycle. The rate of percolation through the resin averaged 1500 grams of liquor per hour. After 6000 grams of lactic acid passed through the column, the concentration of amino acids in the effluent began to rise rapidly from less than 0.01% by weight and no further process liquor was added to the column. The column was then washed with water until 0.25% lactic acid by weight remained in the rinse water. 1000 ml. of 5% aqueous sodium hydroxide solution was then passed through the column at a rate of 30 ml. per minute. Then water as passed through the column until all residual alkali was washed away. Water was then forced up through the bottom of the column at a rate of 30 to 35 ml. per minute until 1000 to 1500 ml. had been passed through. Then 1000 ml. of a 7½% aqueous hydrochloric acid solution was poured down through the column followed by 500 ml. of water, both at the rate of 30 ml. per minute.

After this a second batch of 6000 grams of 80% lactic acid was treated with the column as described in the beginning of the experiment. The entire procedure was repeated over 90 times.

The original color of the process liquor and dissolved lactic acid before passage through the cation exchange resin was a light yellow. After the cation resin treatment the color was water white. The color stability of the untreated liquor and the cation exchanged liquor was tested by heating a sample of each in a test tube for 30 minutes in a bath at 180° C. in conventional manner. The color of the untreated sample darkened considerably while that of the cation resin exchanged sample remained clear, transparent and water white.

*Example 2*

The procedure of Example 1 was repeated except that two columns of the cation exchange resin connected in series, each 40½ inches high and each containing 3½ cubic feet of resin, were used in place of the single column of Example 1. 450 gals. of process liquor containing 80% lactic acid was passed through the columns before they became exhausted. The columns were discharged by washing the resin therein with 125 gals. of 10% aqueous sodium hydroxide solution over a 14 minute period. Then 90 gals. of water was passed through the columns in 10 minutes. After this 429 gals. of water was forced through the columns in reverse flow over a 32 minute period. The columns were regenerated by percolating 135 gals. of 10% aqueous hydrochloric acid solution through them over a 15 minute period. The columns were then washed with 90 gals. of water in 10 minutes and then with 180 gals. of water in 15 minutes. A second batch of process liquor was then passed through the columns as described for the first batch. The entire procedure was repeated 6 times.

The result of color stability tests of samples of Example 2 were equivalent to those of Example 1.

*Example 3*

The procedure and ingredients of Example 2 were repeated. The process liquor discharged from the two columns of cation resin was passed through a column 30 inches high containing 40.5 cubic inches of a weak base polystyrene anion exchange resin having primary secondary and tertiary amines as functional groups. 5,500 grams of lactic acid was passed through the anion resin before it was exhausted. The lactic acid was recovered by washing the resin with water until the concentration of lactic acid in effluent rinse water dropped to 0.25% by weight. The column was regenerated by pouring 1000 ml. of a 7.5% aqueous sodium hydroxide solution into the column at a rate of about 25–30 ml. per minute. Then residual alkali was washing out of the column with 1250–1500 ml. of water over a 53–40 minute period. The column was then ready to collect an additional batch of lactic acid.

The color stability of the anion exchanged lactic acid was tested and found to be slightly better than that of the cation exchanged samples of Examples 1 and 2.

It will be understood that it is intended to cover all changes and modifications of the preferred embodiment of the invention, herein chosen for the purpose of illustration, which do not constitute departures from the spirit and scope of the invention.

We claim:

1. A process for increasing the color stability of a fermentation mixture produced by the action of a Lactobacillus microorganism on carbohydrates and containing lactic acid which comprises the steps of treating the fermentation mixture with a cation exchange resin, and separating the treated fermentation mixture from the cation exchange resin without extraction of the acid from the mixture said mixture having the capacity to withstand being heated for thirty minutes at 180° C. without darkening in color.

2. A process for increasing the color stability of a fermentation mixture produced by the action of a Lactobacillus microorganism on carbohydrates and containing lactic acid which comprises the steps of treating the fermentation mixture with a cation exchange resin, then treating the fermentation mixture with an anion exchange resin, and separating the treated fermentation liquor from the anion exchange resin without extraction of the acid from the mixture said mixture having the capacity to withstand being heated for thirty minutes at 180° C. without darkening in color.

3. A process for increasing the color stability of a fermentation mixture produced by the action of a Lactobacillus microorganism on carbohydrates and containing lactic acid which comprises the steps of heating the fermentation mixture to evaporate water thereform, continuing to evaporate until the concentration of lactic acid in the fermentation mixture is approximately 80% by weight, cooling the fermentation mixture, treating the fermentation mixture with a cation exchange resin, and separating the treated fermentation mixture from the cation exchange resin without extraction of the acid from the mixture said mixture having the capacity to withstand being heated for thirty minutes at 180° C. without darkening in color.

4. A process as in claim 3 which includes the added step of treating the fermentation mixture with an anion exchange resin after the cation exchange resin treatment, the so treated fermentation mixture thereafter being separated from the anion instead of the cation exchange resin.

References Cited by the Examiner

UNITED STATES PATENTS

| | | | |
|---|---|---|---|
| 2,071,368 | 2/37 | Weisberg | 195—48 X |
| 2,253,061 | 8/41 | Cole | 260—535 |

OTHER REFERENCES

"Chemistry and Industry," October 3, 1959, pages page 77.

"Chemistry and Industry," October 3, 1959, pages 1242–1243.

LORRAINE A. WEINBERGER, *Primary Examiner.*

LEON ZITVER, *Examiner.*

UNITED STATES PATENT OFFICE
CERTIFICATE OF CORRECTION

Patent No. 3,202,705

August 24, 1965

Eugene L. Powell et al.

It is hereby certified that error appears in the above numbered patent requiring correction and that the said Letters Patent should read as corrected below.

Column 1, line 28, for "The treatment" read -- Treatment --; lines 29 and 30, for "objectionably" read -- objectionable --; column 2, line 4, for "absorbent" read -- adsorbent --; column 4, line 11, for "frementation" read -- fermentation --; line 28, for "threated" read -- treated --; line 51, for "mtterial" read -- material --; column 7, line 10, for "thereform" read -- therefrom --; column 8, line 13, strike out ""Chemistry and Industry," October 3, 1959, pages" and insert instead -- Chemical and Engineering News, June 15, 1959, --.

Signed and sealed this 16th day of August 1966.

(SEAL)
Attest:

ERNEST W. SWIDER
Attesting Officer

EDWARD J. BRENNER
Commissioner of Patents